United States Patent
Hoggan et al.

(10) Patent No.: US 8,824,372 B2
(45) Date of Patent: Sep. 2, 2014

(54) LOCATION BASED AUTHENTICATION FOR ONLINE SERVICES

(75) Inventors: Stuart Hoggan, Longmont, CO (US); Bernard R. McKibben, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 98 days.

(21) Appl. No.: 13/536,194

(22) Filed: Jun. 28, 2012

(65) Prior Publication Data

US 2014/0003334 A1 Jan. 2, 2014

(51) Int. Cl.
*H04W 4/02* (2009.01)
*H04W 12/06* (2009.01)

(52) U.S. Cl.
USPC ........................................... 370/328

(58) Field of Classification Search
CPC .......... G06F 17/30165; G06F 21/6272; G06Q 10/10; G10L 15/1822; G10L 15/30; H04L 63/0892; H04L 63/107
USPC .............. 370/254–350; 709/201–213
See application file for complete search history.

(56) References Cited

U.S. PATENT DOCUMENTS

| | | | |
|---|---|---|---|
| 2010/0058064 A1* | 3/2010 | Kirovski et al. | 713/176 |
| 2011/0067119 A1* | 3/2011 | Baum | 726/34 |
| 2012/0214444 A1* | 8/2012 | McBride et al. | 455/411 |
| 2012/0220326 A1* | 8/2012 | Li et al. | 455/509 |
| 2013/0170392 A1* | 7/2013 | Wyler | 370/254 |

* cited by examiner

*Primary Examiner* — Ayaz Sheikh
*Assistant Examiner* — Debebe Asefa
(74) *Attorney, Agent, or Firm* — Great Lakes Intellectual Property, PLLC

(57) ABSTRACT

Providing access to online services is contemplated. The online services authorized for access may be limited or controlled according to a location of an access point used to facilitate access to the online services. This location based authorization may be useful in providing access to online services that have location dependent restraints.

18 Claims, 5 Drawing Sheets

LOCATION BASED AUTHENTICATION FOR ONLINE SERVICES

TECHNICAL FIELD

The present invention relates to providing location based authentication of online services, such as but not necessarily limiting to allowing access to online services when an accessing device is one location and prohibiting access to the same online services when the accessing device is in another location.

BACKGROUND

A service provider (SP), such as but not necessarily limited to a television service provider, a cable television service provider, a broadcast television service provider, a satellite television service provider, an Internet service provider (ISP), a cellular phone service provider, a voice over Internet Protocol (VoIP) service provider, a multiple system operator (MSO), etc., may be configured to provider various services to their subscribers. The services may include television programming, gaming, data transmission, telephony, and virtually any other type of messaging or signaling dependent service. These services may be provided to the subscribers over various communication mediums, such as a wireless/wireline network, a hybrid fiber coax (HFC) platform, a cellular network, etc. The associated signaling may be processed with various types of accessing devices, such as but not limited to a gateway, settop box (STB), media terminal adapter (MTA), personal digital assistant (PDA), cellular phone, computer, tablet, television, appliance, etc. These services may be considered as online service in the event the accessing devices are able to access the services through the Internet using common protocols, such as but not limited to Internet Protocol (IP) and Hypertext Transfer Protocol (HTTP).

The service providers may have restraints on their ability to provide the same services across different locations or geographical areas. One type of restraint may be in the form of a contractual commitment where the service provider is able to provide one service in one location while being prohibited from providing the same service in another location. One example may include transmission of television signaling for a particular sporting event. The service provider may be prohibited from transmitting signaling of the sporting event to an area proximate a venue at which the sporting event is taking place while at the same time being permitted to transmit signaling for the sporting event to an area farther away from the venue. The service provider is thereby required to provide certain limitations on the locations to which the corresponding television signaling is permitted to be transmitted. These limitations may be implemented with infrastructure based controls of the type where an infrastructure employed by the service provider to carry the corresponding signaling is managed to limit the locations at which services are available, e.g., by enabling a headend or other television signaling source in one area to transmit signaling of the sporting event while preventing a headend located in another area from transmitting signaling of the sporting event.

The infrastructure based control may be accomplished since a backend or backbone infrastructure supports a fixed/dedicated signaling path between the headend and the accessing device. This allows the service provider to control the dedicated medium in a manner sufficient to implement desired location based restraints on certain signal transmissions. The reliance infrastructure based control becomes problematic when the service is an online service of the type where signaling may be carried over multiple mediums or mediums that are not dependent on a fixed/dedicated signaling path. Online services, in contrast to some continuous signal or point-to-point transmissions, may be supported with packet-switch types of communications such that various data packets used to facilitate the service are transmitted through multiple portions of one or more networks, such as the Internet, and without reliance on a dedicated or fixed signaling path. These types of online services may not be sufficiently susceptible to infrastructure based control, i.e., access to the online services cannot be controlled by simply preventing a headend from transmitting. Accordingly, a need exists to enable service providers to implement location based authentication for online services.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
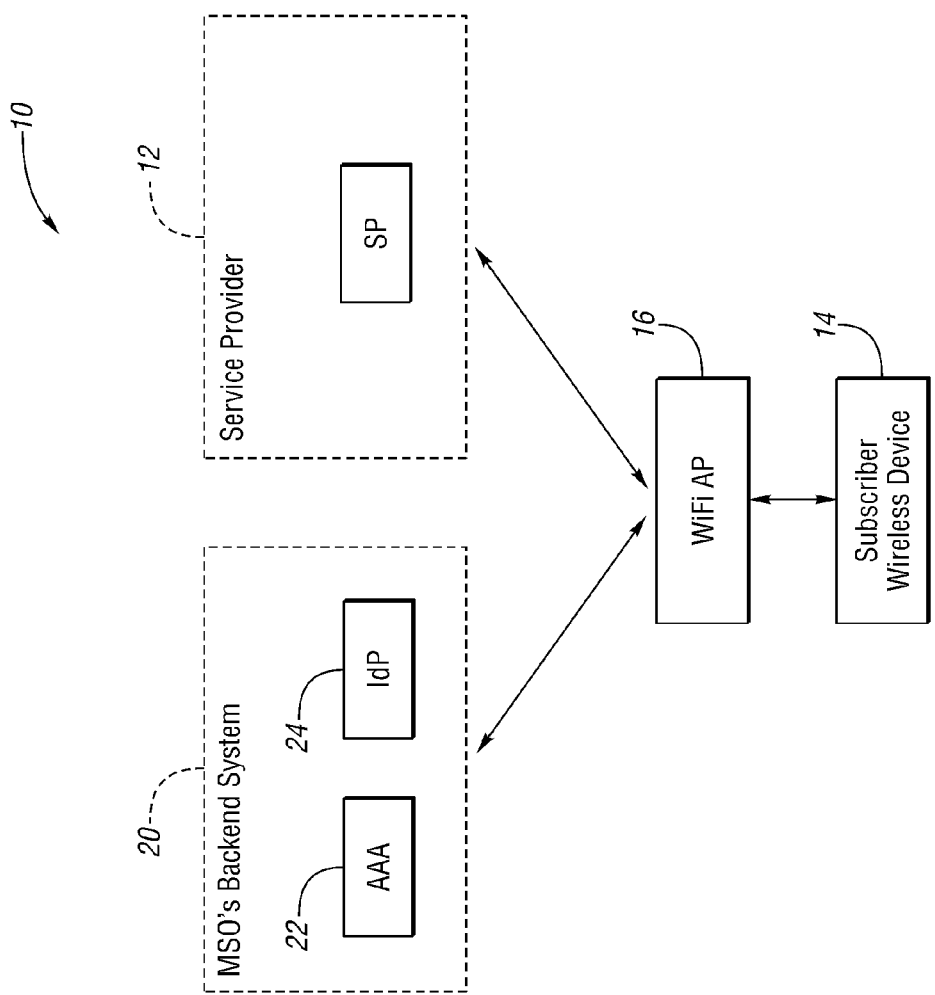
FIG. 1 illustrates a system for providing online services in accordance with one non-limiting aspect of the present invention.

FIG. 1 illustrates a system 10 for providing online services in accordance with one non-limiting aspect of the present invention. The system 10 includes a service provider 12 configured to provide services to a subscriber wireless device 14 by way of a wireless access point 16. The service provider 12 may be configured to transmit signals over a wireline or wireless network for routing by the access point 16 to the wireless device 14. The service provider 12 and wireless device 14 may correspond with any of the service providers and wireless devices noted above. The service provider 12 may be configured to facilitate subscriber access to virtually any type of signaling based service. The service provider 12 may be associated with a multiple system operator (MSO) or other entity having capabilities sufficient to facilitate providing services to the wireless device 14. The services may include online services of the type where the service provider or other entity sources or facilitates directing services related signaling to the wireless device 14. The system 10 may be configured to facilitate location based authentication for the online services.

The MSO may include a backend system 20 having an Authentication, Authorization, and Accounting (AAA) server 22 and an identity provider (IdP) 24. The IdP 24 may be configured to facilitate authenticating the wireless device 14 and to facilitate various security related operations, including issuing trusted authentication session tokens and assertions. The IdP 24 may be configured to issue the related certificates and keys or other security-related data sets according to an association between the wireless device 14, the addresses assigned to the wireless device 14, the address assigned to the access point 16, and/or the username and password associated with the user (subscriber). The MSO may include an authorized IP address database (not shown) or other database to facilitate storing and managing a relational association of the addresses, users, and username and password combinations. The AAA server 22 may be configured according to Remote Authentication Dial In User Service (RADIUS), the disclosure of which is hereby incorporated by reference in its entirety. The AAA server 22 may be configured to relate location information with the IP addresses or other information associated with IdP 24.

The wireless access point 16 may be a cable modem (CM), such as but not necessarily limited to one configured according to Data Over Cable Service Interface Specification (DOCSIS), the disclosure of which is hereby incorporated by reference in its entirety, a router, a network address translator (NAT), a gateway, a cellular tower or other device having capabilities sufficient facilitate interfacing signaling between the service provider 12 and the wireless device 14. The present invention is predominately described with respect to the access point 16 facilitating wireless communications at least between the access point 16 and the wireless device 14. The illustrated wireless access point 16 may be associated with the home network of the subscriber or another network within the domain or service area of the service provider 12, e.g., a Wi-Fi hotspot or home network of another subscriber. The access point 16 may be provided by a technician of the service provider when the associated subscriber purchases services. The access point 16 may be assigned a unique mediate access control (MAC) address or IP address at the time it is initially provisioned or at some point thereafter.

Figure 2:
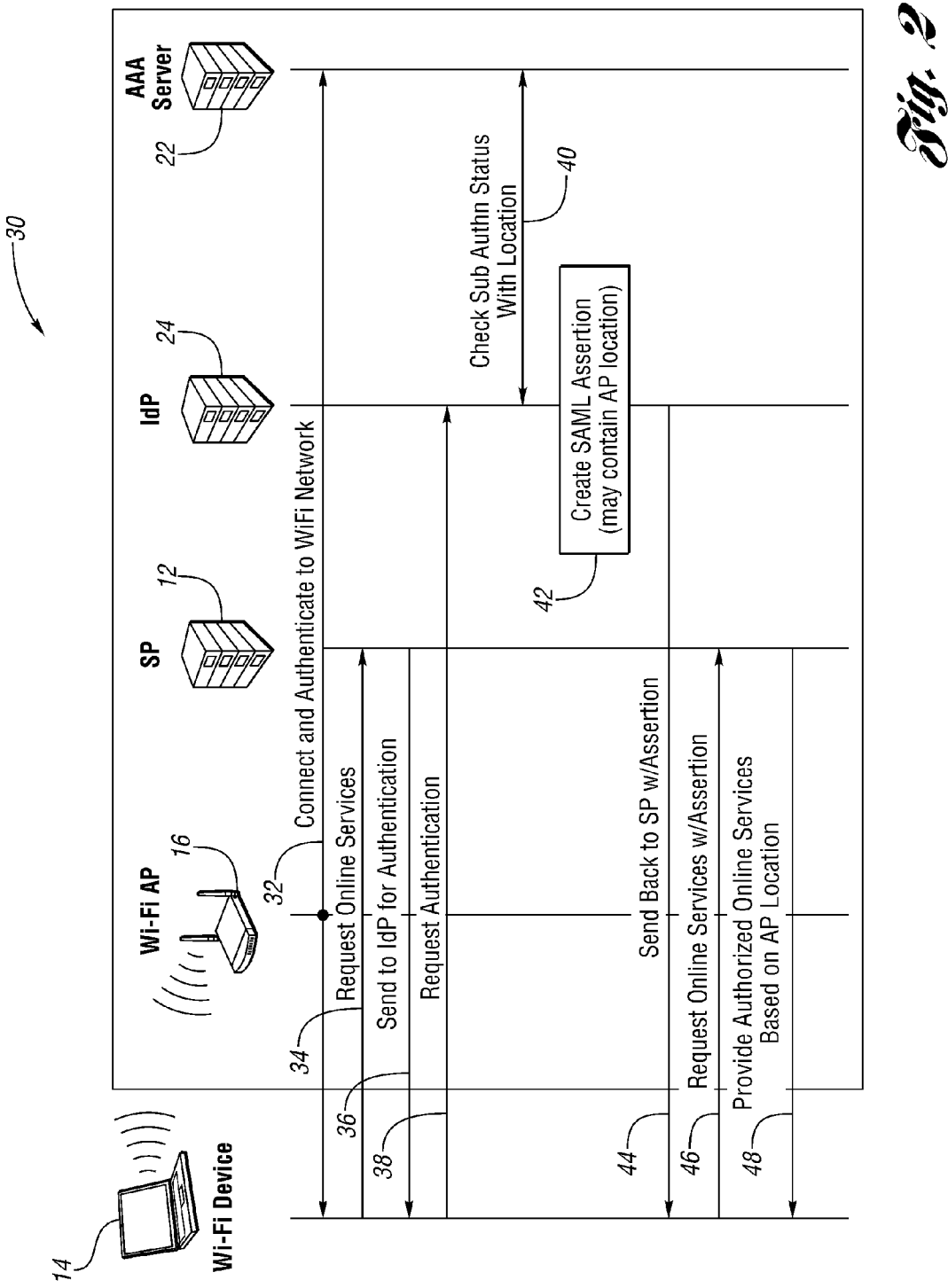
FIG. 2 illustrates a message diagram for a method of location based authentication of online services in accordance with one non-limiting aspect of the present invention.

FIG. 2 illustrates a message diagram 30 for a method of location based authentication of online services in accordance with one non-limiting aspect of the present invention. The method may be facilitate with instruction, code, programming and/or other communications between one or more of the components shown in FIG. 1 or otherwise necessitated to facilitate the contemplated operations. The method may be embodied in a non-transitory computer-readable medium operable with a processor wherein the computer-readable medium includes computer-readable code embodied therein having instructions sufficient for facilitating the contemplated location based authentication of online services. The location based authentication maybe used by the service provider 12 or other source of online services and non-online services to facilitate controlling services accessed according to a location of a corresponding access point. The authentication may be useful in allowing the service provider 12 to abide contractual commitments and other restraints imparted according to a location or other position of the wireless device.

A connect and authenticate operation 32 relates to a process by which the wireless device 14 initially requests an authentication sufficient to access services through the wireless access point 16. This may include allowing the wireless device 14 limited access through the access point 16 in order to facilitate authentication related messaging. The wireless device 14 may be configured to provide certificates or other credentials indicating its entitlement to access services through the access point 16. The authentication process may be of the type described in U.S. patent application Ser. Nos. 13/423,359 and 13/473,745, the disclosures of which are hereby incorporated by reference in their entirety. The authentication process may optionally include zero sign-on (ZSO) functionality. A request for online services message 34 may be issued from the wireless device 14 to the service provider 12 in order to identify the services desired for access. The service provider 12 may issue a directing message 36 for directing the wireless device to send an authentication request 38 to the IdP 24, which may include sending a browser of the wireless device 12 to the IdP 24 for authentication. The IdP 24 may process the authentication request to determine whether the wireless device 14 meets certain security requirements required to be granted access to the requested services.

The IdP 24 may be configured to check a source IP address included in the authentication request to see if the request is coming from a Wi-Fi network. The IdP 24 may then issue an authentication status message 40 to the AAA server 22 to verify that the wireless device 14 with that source IP address is a home subscriber, i.e., within the service domain of the service provider 12, and that it has successfully authenticated. It may also request a location of the access point 16 to be included with the authentication request message or to be otherwise transmitted. Upon receipt of a response to the authentication status message, the IdP 24 may create a Security Access Markup Language (SAML) or other sufficient assertion 42 containing the subscriber's authentication status as well as the access point location. A message 44 may then be communicated with the assertion for use in issuing a service request 46 to the service provider 12. The service request may be automatically provided, optionally in a manner transparent to a user of the wireless device, using an application or browser when the subscriber attempts to access a service of the service provider 12.

The service provider 12 may indicate a grant or denial of access to the requested service with a message 48, or provide a substitute service, according to a check of the assertion. The service provider 12 may check the authentication status to determine whether the wireless device has rights to access the request service. The service provider 12 may be configured to provide a variety of services, including subscription based services where a subscriber may be granted access to certain service tiers or grouping of services depending on a subscription status. For example, the service provider may include certain services available to all subscribers or a general group of subscribers, e.g., basic television channels, another level of services available for certain subscribers that have purchased enhanced services, e.g., premium television channels, and many other potential levels of service, e.g., high definition channels, personal video recording, gaming, etc. Of course, depending on the particular bundle of available services any number of other gradients or stratifications may be used to facilitate authenticating different levels of services.

Some of the available services may be proportioned into parts or segments which combined to form the totality of services within a corresponding grouping, e.g., premium and non-premium television channels. This may allow one device to be granted access to a part of or all of a particular set of services, e.g., to one or both of the premium and non-premium television channels depending on an authentication status of the wireless device and/or the associated user. The service provider may include a look-up table or other relational database to facilitate relating parts or portions of the available online services according to an authentication status type. The authentication status table may include various types depending on the different situations of available services, such as but not necessary limited to a first, second, etc. type of authentication status. The authentication status may be specific to the wireless device 14 and/or the associated user such that it is the same regardless of the current location of the wireless device 14, e.g., the authentication status may be one of the first type and the second type regardless of whether the wireless device 14 is at home of the subscriber or at a Wi-Fi hotspot of the service provider.

The service provider 12 may further limit or control the services permitted to the subscriber according to the current location of the wireless device 12. This may include the service provider 12 preventing the wireless device 14 from accessing certain online services, e.g., the service provider 12 may prevent the delivery of television signals associated with a sporting event depending on whether the current location of a wireless device 14 is within a blackout region associated with a venue at which the sporting event is taking place. This control may be implemented without reliance on the backend infrastructure other infrastructure-based control. This may be accomplished by controlling websites that the browser of the wireless device 14 is able to access or addresses to which the wireless device 14 is able to communicate or request information or data from. The browser or other application of the wireless device may be prohibited from reaching certain web servers or other entities from which prohibited or blocked information can be retrieved. This ability to prevent the wireless device 14 from communicating with certain sources of content may be distinguished from the backend or infrastructure-based control since it eliminates the need of the service provider 12 to prevent devices from transmitting data to the wireless device 14 in favor or more simply preventing the wireless device 12 or the wireless access point 14 from communicating messages.

The service provider 12 may also implement the location-based control by substituting services or content for the requested content. Instead of preventing the wireless device 14 or the access point 16 from communicating messages to certain web servers or other end points, the service provider 12 may be configured to intercept or replace information transmitted thereto with substitute services or content. This, for example, may include the service provider 12 substituting advertisements within accessed content according to the location of the wireless device 14 instead of permitting an advertisement included with the content or directed by the end point 14 to be displayed to the user, which may be useful in facilitating location-based advertising or inserting other location-based messages, e.g., emergency alert system (EAS) messaging, local weather forecast, local news, etc. While the present invention, contemplates the service provider 12 providing limited authorization or authentication to certain services without reliance on backend or other infrastructure-based controls, some controls may require the service provider 12 to at least partially rely on such backend controls, such as if a user attempts to rely upon a personal video recorder (PVR) when in a location outside an authorized location range for content associated with the corresponding PVR stream, i.e., to prevent the use of temporary PVR recording to thwart location based restraints on content.

Figure 3:
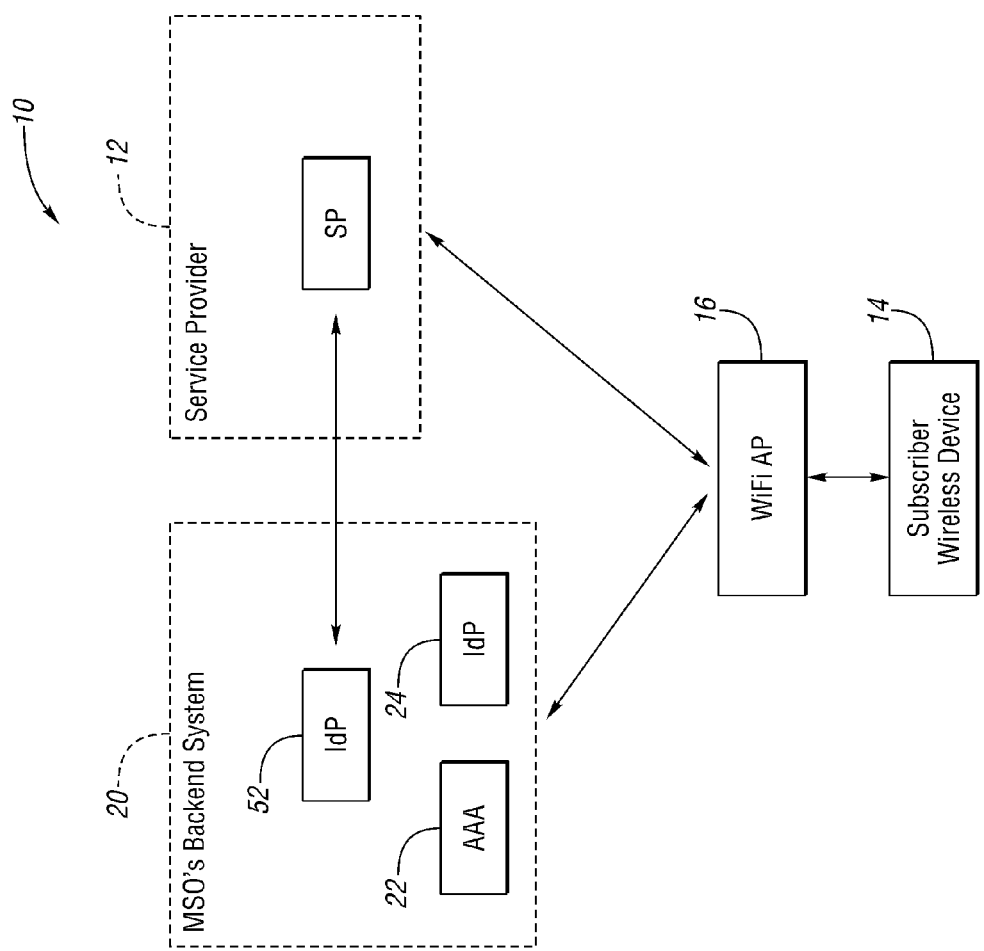
FIG. 3 illustrates a system for providing online services in accordance with one non-limiting aspect of the present invention.
Figure 4:
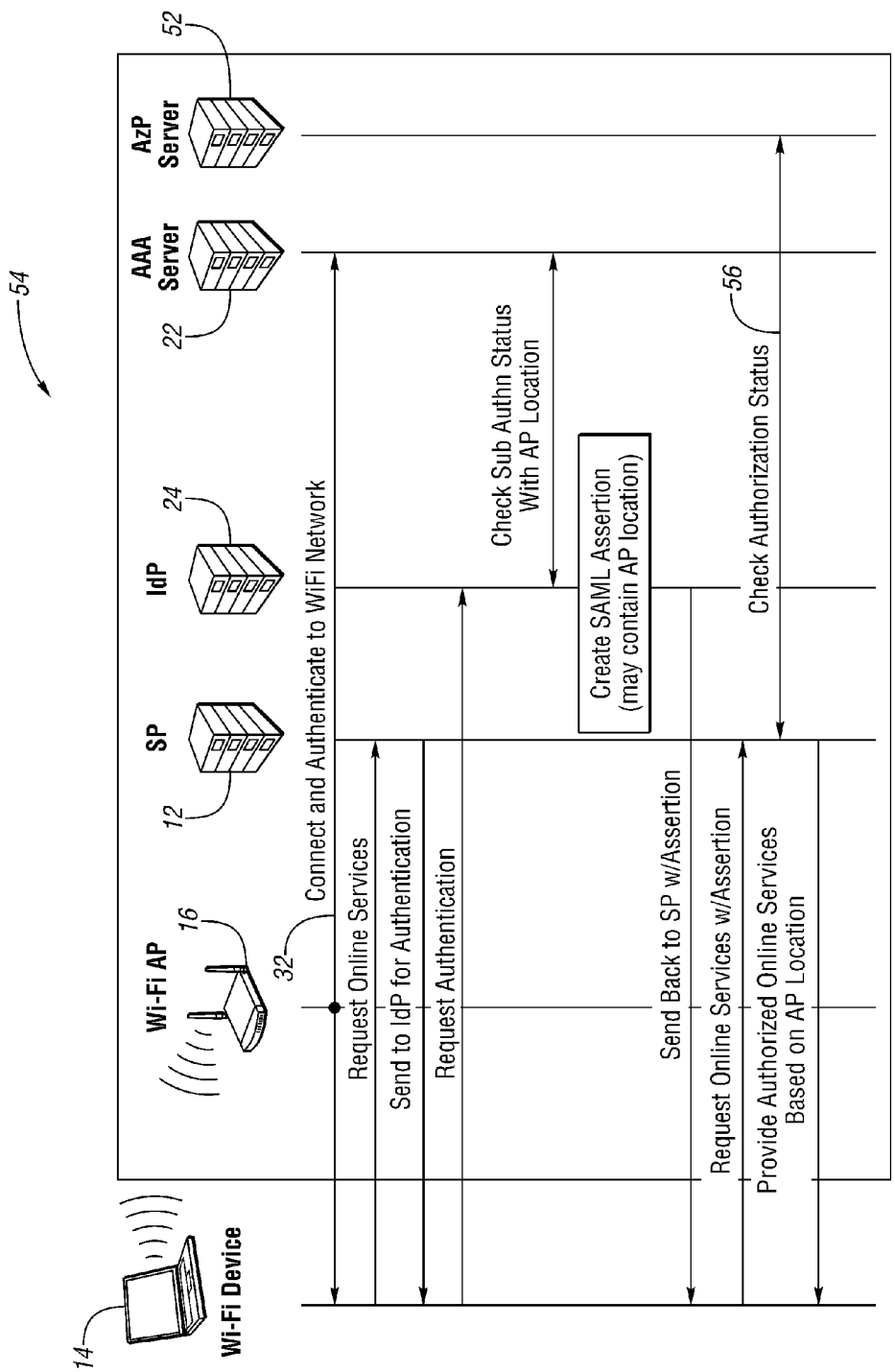
FIG. 4 illustrates a messaging diagram for a method of location based authentication of online services in accordance with one non-limiting aspect of the present invention.

FIG. 3 illustrates a system 50 for providing online services in accordance with one non-limiting aspect of the present invention. The system 50 is generally similar to the system shown above with respect FIG. 1 with an additional authorization provider (AzP) server 52. The AzP server 52 may be configured to respond to authorization requests from the service provider 12 on specific online service/content. The AzP 52 may be defined according to CableLabs OLCA 1.0 specification, the disclosure of which is hereby incorporated by reference in its entirety, to optionally include one or more of SOAP based protocol using SAML & XACML messaging, REST and/or supporting other flexible methods for identifying content. FIG. 4 illustrates a messaging diagram 54 for a method of location based authentication of online services in accordance with one non-limiting aspect of the present invention. The message flow diagram 54 is generally similar to the one illustrated in FIG. 2 with the addition of the AzP server 52.

After a subscriber or the wireless device 14 is authenticated with the service provider 12, the service provider 12 in response to receipt of the request from online services having the assertion, can make direct authorization requests 56 to the AzP server 52 for specific services/content restrictions. The AzP server 52 may be configured to provide a more granular level of service control than the type-based authentication status described above with respect to FIG. 2. The contemplated level of granularity may include specifying specific types of content available within the online services that are available to the wireless device given its authentication status, e.g., the authentication status may specify specific television programs or content that the wireless device is able to access as opposed to the more general premium and non-premium channel restrictions noted with respect to FIG. 2. Of course, the variability and breadth of online services may dictate the granularity at which the service provider 12 is able to control access (FIG. 2) and for which the AzP server 52 is able to provide a more specific type of control (FIG. 4). Following the authentication status control or limitation of online services, the service provider 12 may then implement location-based limitations in manner similar to that described above.

Figure 5:
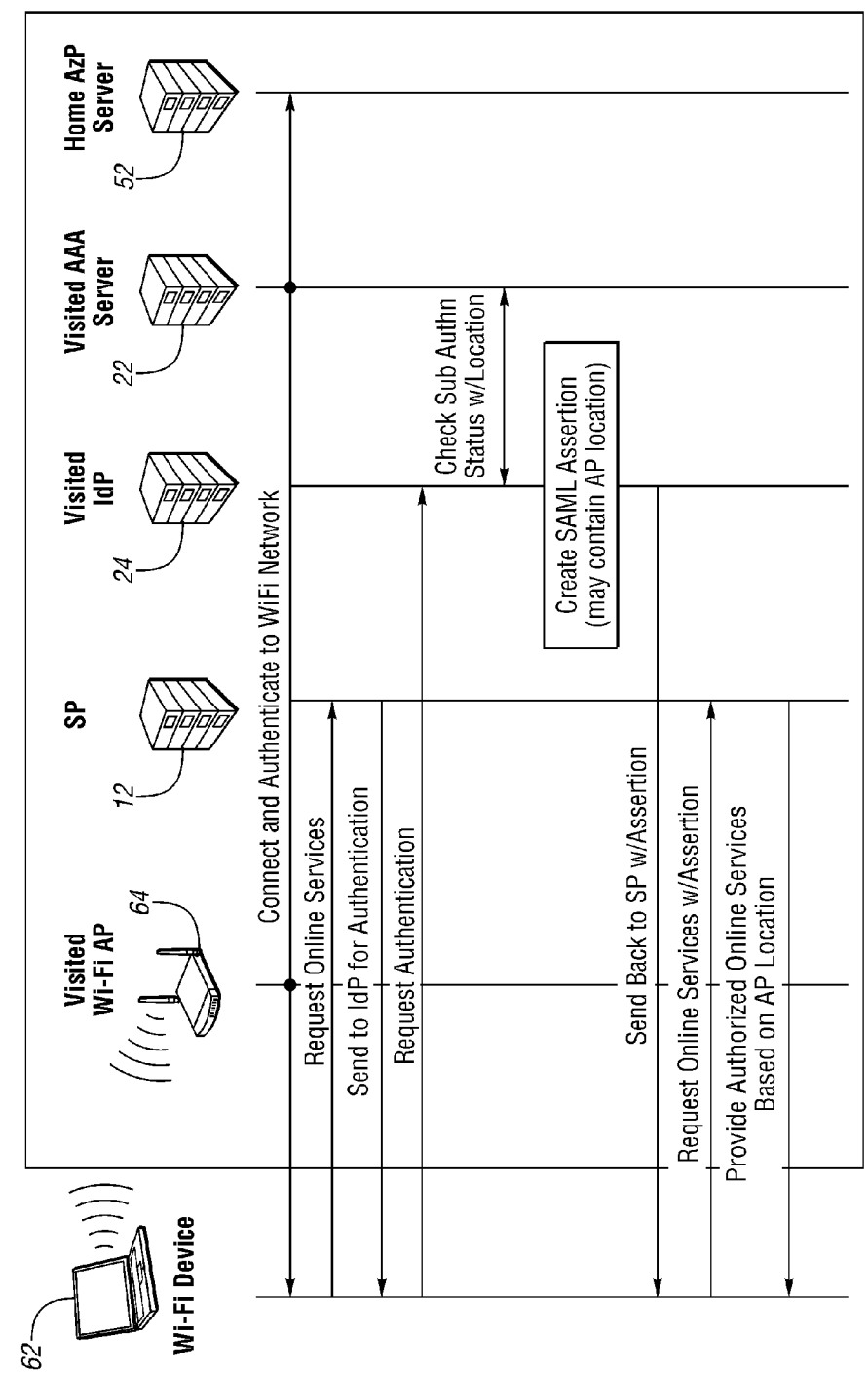
FIG. 5 illustrates a messaging diagram for method of location based authentication of online services when a wireless device is roaming in accordance with one non-limiting aspect the present invention.

FIG. 5 illustrates a messaging diagram 60 for method of location based authentication of online services when a wireless device 62 is roaming in accordance with one non-limiting aspect the present invention. A visited wireless access point 64 may correspond with an access point on a wireless network beyond the domain or control of the subscriber's home service provider. U.S. patent application Ser. No. 13/423,359 illustrates an exemplary scenario which the wireless device 62 may roam from a home network or access point (FIGS. 1-4) to a visited network or access point. The method shown within FIG. 5 is generally similar to the method shown with respect to FIGS. 2 and 4 with the exception that the authentication process relies upon communication between a visited AAA server 66 of a visited network and a home AAA server 68 of the home network of the subscriber. This may include the AAA servers 66, 68 exchanging information sufficient to facilitate identifying any authentication status and location-based restrictions on available online services according to the authentication status and/or location restrictions defined between the subscriber and the home network and/or between the home network and the visited network The roaming method of facilitating authentication to online services can be supported by having a visited network IdP 70 assert the authentication status of a roaming subscriber. This may include the roaming subscriber connecting to the visited network to access the Internet. The visited network may then check a home network authentication status by acting as a proxy to the home AAA server 68. The visited network IdP may be asked to authenticate the subscriber when the subscriber accesses online services. The IdP 70 can learn from the visited network AAA server 66 that the subscriber is roaming and was authenticated by a partner's home AAA server 68. It can also learn the IdP & AzP server URLs of the home network. The IdP 70 can create an assertion containing this information and sends it back to the online service provider for by the IdP & AzP URLs to further authenticate or request authorization status from the home network.

It may be necessary to detect the type of device the subscriber is using when authenticating them for online services, e.g. Android, iPhone, iPad, etc. JavaScript can be used by the IdP or SP to extract device type information, such as during IdP subscriber authentication or after service provider authentication & authorization check. This information may then be used by the service provider to further limit authentication of online services. The processes contemplated by the present invention may be offered within the MSO's network domain or outside the domain from a 3rd party business partner. Subscriber authentication may be automatic when requesting online services and leverage the subscriber's authentication status on the MSO's Wi-Fi network. Wi-Fi AP location information may be sent to the online service provider so it can make a decision on what services to make available to the subscriber depending upon their location. The online service provider may not have access to subscriber authentication credentials. The subscriber may not be required to create a new set of log-in credentials for the online service. The authentication process may be sufficient to accommodate any NATs that exist between the subscriber device and the service provider. In the event a MSO chooses to have more control over online service authorization, the following options could be used: IdP can check subscriber location against SP authentication request and include a flag/attribute in the assertion that they are or are not authorized to access services; and blocking or allowing onlines services, not a subset.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for providing online services through a wireless device, the system comprising:
    a service provider configured to provide online services, including a first online services, a second online services and a third online services;
    a first access point at a first location configured to provide a first wireless network through which the wireless device communicates with the service provider to access the online services;
    a second access point at a second location configured to provide a second wireless network through which the wireless device communicates with the service provider to access the online services;
    wherein the service provider is configured to limit access to the online services depending on whether the wireless device is at one of the first location and the second location, the service provider limiting access to the first online services and the third online services when the wireless device is at the first location, the service provider limiting access to the second online services and the third online services when the wireless device is at the second location; and
    wherein the service provider limits the wireless device when at the second access point to the second and third services by preventing an application operating on the device to access the first service from reaching a server, the device requiring communications with the server in order to access the first service.

2. The system of claim 1 wherein the service provider is further configured to authorize access to the online services depending on an authorization status of the wireless device, including authorizing the wireless device to one or more of a first part and a second part of the first online services and a third part and a fourth part of the second online services.

3. The system of claim 2 wherein the service provider is configured to:
    authorize the wireless device to access each of the first part, the second part, the third part and the fourth part in the event the authorization status is of a first type;
    authorize the wireless device to access no more than the first part and the third part in the event the authorization status is of a second type, including preventing the application from issuing requests necessary to access the second part and the fourth part.

4. The system of claim 3 wherein the authorization status is determined as a function of a user associated with the wireless device and independently of whether the wireless device is at the first location or the second location.

5. The system of claim 1 wherein the service provider is configured to determine whether the wireless device is at the first location and the second location depending on an Internet protocol (IP) address associated with an online service request message issued from the wireless device, the online service request message identifying one or more of the first online services and second online services desired to be access by the wireless device, and wherein the service provider is configured to prevent application operating on the device from reaching the server by preventing the device from transmitting data to the server or by preventing the second access point from transmitting data to the server.

6. A method of providing location based authentication for a plurality of online services, the method comprising:
    authenticating a device to access online services through a wireless access point, the authenticating including the device being previously provisioned with an assertion, the assertion identifying a location of the wireless access point;
    processing the assertion to identify a location dependent portion of the plurality of online services to be available to the device, the location dependent portion being determined as a function of a current location of device; and
    authorizing the device to access the location dependent portion of the plurality of online services through the wireless access point, including limiting the device to a first portion of the location dependent portion when the current location is a first location and limiting the device to a second portion of the location dependent portion when the current location is a second location, the first portion being greater than the second portion, and when the current location is the second location, limiting the device to the second portion by preventing the device from transmitting data beyond the wireless access point to at least some of one or more servers utilized to provide access to the first portion of the plurality of online services.

7. The method of claim 6 further comprising processing the assertion to identify an authentication dependent portion of the location dependent portion of the plurality of online services to be available to the device, the authentication dependent portion being determined as a function of an authentication status identified within the assertion.

8. The method of claim 7 further comprising authorizing the device such that that the online services are accessible through Internet Protocol (IP) based communications.

9. The method of claim 6 further comprising cross-referencing an Internet protocol (IP) address of the wireless access point with an IP-location service map to identify the current location, the IP-location service map categorizing location information for a plurality of IP addresses.

10. The method of claim 6 further comprising requesting the wireless access point to identify the current location as part of the authenticating.

11. A method of providing online services, the method comprising:
- authenticating a device to access a first portion of the online services through a first wireless access point, the first portion being determined as a function of a first location of the first wireless access point, including determining the first location as a function of a first Internet Protocol (IP) address associated with the first wireless access point;
- subsequently authenticating the device to access a second portion of the online services through a second wireless access point, the second portion being determined as a function of a second location of the second wireless access point, including determining the second location is a function of the second IP address associated with the second wireless access point; and
- when the device is determine to be at the second location and requests access to a first service associated with the first portion of the online services, substituting the first service with a second service, the second service being associated with the second portion of the online services and different from the first service.

12. The method of claim 11 further comprising authorizing the device such that the first portion of online services is different from at least some of the second portion of the online services and substituting the first service with the second service by intercepting data transmitted from a server in response to receiving a request from the device for the first service and replacing the intercepted data with data associated with the second service.

13. The method of claim 11 wherein the second portion comprises at least a first part and a second part and wherein the method further comprises authenticating the device to access at least one of the first part and the second part depending on an authentication status of the device.

14. The method claim 13 further comprising authenticating the device to access both of the first part and the second part in the event the authentication status is of a first type and authenticating the device to access one of the first part and the second part in the event the authentication status is of a second type.

15. The method of claim 13 further comprising determining the authentication status to be the same at the first location and the second location.

16. The method of claim 13 further comprising determining the authentication status as a function of a user associated with the device.

17. The method of claim 6 further comprising preventing the device from transmitting data beyond the wireless access point by blocking an application operating on the device from transmitting requests beyond the device to the at least some of the one or more servers utilized to provide access to the first portion of the plurality of online services.

18. The method claim 6 further comprising preventing the device from transmitting data beyond the wireless access point by blocking the wireless access point from relaying requests issued from an application operating on the device to the at least some of the one or more servers utilized to provide access to the first portion of the plurality of online services.

* * * * *